United States Patent [19]

Liebert et al.

[11] 4,344,283

[45] Aug. 17, 1982

[54] HYDROSTATIC AUXILIARY POWER STEERING

[75] Inventors: Karl-Heinz Liebert, Schwabisch Gmund; Werner Tischer, Bobingen; Christoph Deppenbrock, Schwabisch Gmund, all of Fed. Rep. of Germany

[73] Assignee: Zahnradfabrik Friedrichshafen, AG., Friedrichshafen, Fed. Rep. of Germany

[21] Appl. No.: 147,601

[22] Filed: May 7, 1980

[30] Foreign Application Priority Data

May 11, 1979 [DE] Fed. Rep. of Germany ....... 2919051

[51] Int. Cl.³ .......................... B62D 5/08; F15B 13/04
[52] U.S. Cl. ................................. 60/384; 137/625.69; 418/61 B
[58] Field of Search .................. 60/384, 625.69; 418/61 B; 137/625.69, 625.21, 625.24, 625.68; 180/132

[56] References Cited

U.S. PATENT DOCUMENTS

Re. 25,126 2/1962 Charlson .
4,251,194 2/1981 Petersen ............................ 418/61 B

FOREIGN PATENT DOCUMENTS 2505569 8/1975 Fed. Rep. of Germany .

Primary Examiner—Irwin C. Cohen
Attorney, Agent, or Firm—Zalkind & Shuster

[57] ABSTRACT

An auxiliary steering flow control device having known features of a rotatable steering spindle which initially effects axial shift of a valve sleeve through a torsional stressing device acting on a pair of compressibly arched leaf springs longitudinally disposed on the axis of the steering spindle and carried in a holder within the steering spindle. The leaf springs have contiguous contacting arched surfaces on the steering spindle axis and the arched configuration effects a back to back pretensing that augments the potential energy that can be stored in the springs, particularly in arched surface contiguity with each other.

9 Claims, 4 Drawing Figures

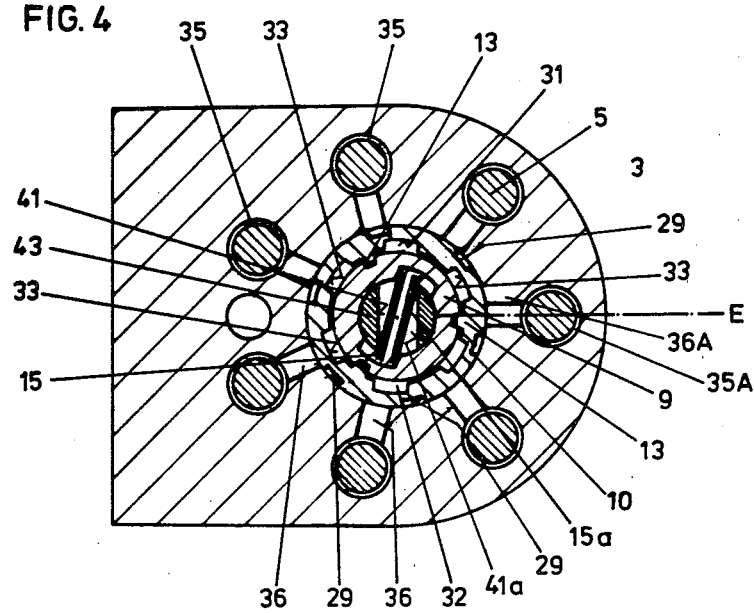

HYDROSTATIC AUXILIARY POWER STEERING

Cross reference is made to the following pending applications:
Werner Tischer, Ser. No. 136,471, filed Apr. 2, 1980;
Karl-Heinz Liebert, and Werner Tischer, Ser. No. 147,583, filed May 7, 1980;

The above applications have the same assignee as the present application and show the same general constructions except for individual features claimed.

Prior art background patents:
German OS No. 14 80 720
German OS No. 27 18 148
German OS No. 25 05 569
U.S. Pat. No. Re. 25,126
U.S. Pat. No. 3,989,120
U.S. Pat. No. 3,180,233
U.S. Pat. No. 3,385,057
U.S. Pat. No. 3,452,543.

In general, auxiliary power systems for vehicles in many instances have steering control devices involving arrangements of a housing with a valve sleeve axially shiftable therein for pressure and exhaust control to a servomotor upon rotation of a steering spindle by some means such as cam grooves and pins or coarse or high pitch threads intermediate the steering spindle and the interior of the valve sleeve. Rotation of the spindle relative to the valve sleeve thus axially shifts the valve sleeve through a rotationally stressed spring such as a torsion rod or leaf springs up to a predetermined point where no further axial shift occurs but continued rotation of the steering spindle then rotates a metering pump along with the valve sleeve.

The torsional stress device is the heart of the present invention and overcomes certain disadvantages of prior art types of torsional stress devices.

Concerning the prior art, German Patent OS No. 17 51 979 shows a steering control arrangement as generally described above utilizing a torsional stress device for returning the valve sleeve to a neutral position after a steering operation wherein a torsion rod of considerable axial length is used which is twisted by rotation of the steering spindle up to a limiting point provided within the arrangements. During such twisting a valve sleeve is axially shifted by the action of intermediate means such as a thread connection between the steering spindle and the valve sleeve. Such arrangements are very well known and other patents of interest in that connection are U.S. Pat. Nos. 3,989,120 and 3,180,233.

Torsion rods have the disadvantage of a limited heat dissipating surface and therefore cannot quickly dissipate heat which occurs during the twisting of the bar. Further, such torsion rods are expensive to produce due to the transition points where the narrow, twistable section of the rod merges into the relatively heavy ends.

German Patent OS No. 25 05 569 shows an arrangement wherein a torsional leaf is twistable about its central axis as a return element for a valve sleeve using a pair of such torsion springs in the form of leaves is used to reduce width and length. However, in the case of torsion rods or in the case of leaves of the kind shown in the above described German patent, there is no precise return to an exactly neutral position. It is possible that a valve sleeve after being shifted to a neutral position for straight ahead steering, might actually not be in an exact neutral position due to all the frictional forces involved not being overcome by the spring devices of the prior art. In further description of the prior art, U.S. Pat. No. 3,385,057 to Pruvot shows an arrangement in which packets of curved leaf springs are disposed back to back transversely to the leaf lengths and to the axis of rotation of the valve sleeve which are stressed by being compressively flattened. This has the disadvantage in that in order to produce the required rotary return force within the permissible bending stress of the leaves they must be so transversely dimensioned that they cannot be made to fit within the conventional diameters of steering control devices of the kind described. In practice, it has been found that such transversely disposed leaf springs have been too weak for exact return to neutral position of the valve sleeve.

The present invention overcomes the difficulties of the prior art and discloses a simple leaf spring construction which can be provided with a pretension in neutral position to thus make the overall return force strong enough for all practical purposes to yield a complete return to exact neutral position. The novel construction envisages a pair of longitudinally arched leaf springs assembled back-to-back in a spring carrier and through which rotational stress is transmitted to a metering sump after initial valve sleeve axial shift for flow control. Such arrangement wherein the arched surfaces of the leaf springs are centrally in contiguous longitudinal compression inherently provides for storage of a greater degree of potential energy in torsional stressing of the valve elements for return movement than possible in the devices of the prior art.

A detailed description of the invention now follows, in conjunction with the appended drawings, in which:

FIG. 4 is a radial section illustrating the position of the valving components after rotation of the steering wheel.

Figure 1:
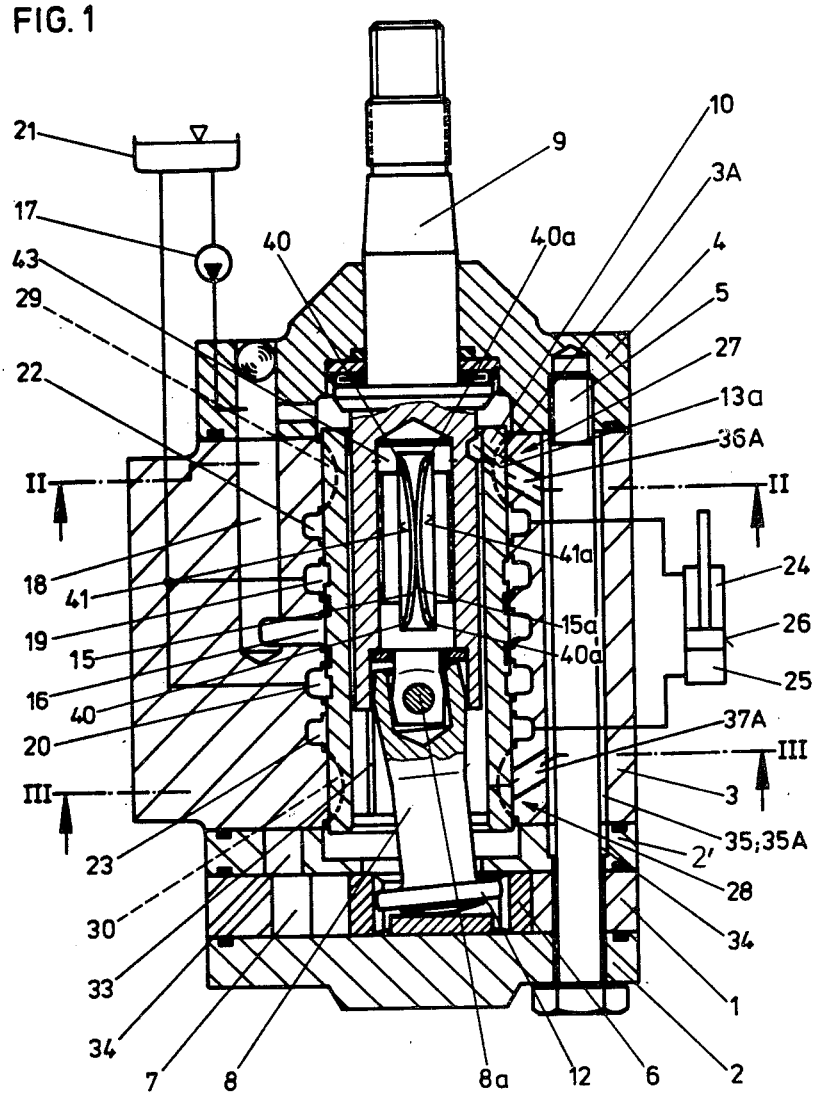
FIG. 1 shows a longitudinal section through an auxiliary power steering device illustrating the principal components of the invention in neutral position.

Referring to the drawing, a metering pump comprises a fixed internal pump gear 1 carried between end cover plate 2 and at the end of housing 3 intermediate the cover plate 2 and a cheek plate 2'. The assembly of housing and plates is secured by screws 5 passing through throughbores of housing 3. Additionally, an externally toothed pump gear 6 within gear 1 is provided with one tooth less than gear 1 and coacts therewith to form hydraulic fluid pump chambers 7 equal to the number of teeth on the gear 1. The construction is sealed by various ring seals as shown in a conventional manner.

Pump gear 6 is articulated through a universal joint shaft 8 and the pivotal pin 8a is in slidably keyed connection with valve sleeve 10 which is held against rotation to effect an axial shift for flow control via coarse thread means, e.g., high pitch threads, comprised in a valve sleeve actuator means, such coarse or high pitch thread coactions being heretofore used for this purpose in German Patent OS No. 1480720.

Housing 3 has an interior bore 3A rotatively supporting valve sleeve 10 within the housing in coaxial relation to the manually operated steering spindle 9. A pair of ears such as 12 (FIGS. 3 and 1) on universal joint shaft 8 rotates gear 6 upon rotation of universal joint shaft 8 when rotated by the steering spindle via a limit stop 14 limiting axial shifting of the valve sleeve relative to the spindle. The steering spindle then drives metering pump gear 6 subsequent to the axial shifting of the valve sleeve which then rotates with the steering spindle but can no longer shift axially, in accordance with known principles.

Valve sleeve 10 is axially movable bidirectionally on rotation of steering spindle 9 by threading such as threading 13 of the valve sleeve extending into respective coarse grooves 13a of the steering spindle (FIGS. 2 and 1), rotation being permitted by movement of pin 8a between opposed limit stops 14 in slots at the end of the steering spindle and effected when steering spindle 9 is rotated to cause the protruding ends of pin 8a to abut one side or the other of the limit stops, depending on direction of rotation of the steering spindle. Intermediate shaft 9 and shaft 8 are disposed leaf springs 15 and 15a. The thread action in constructions of this kind can take various forms as shown in the prior art.

For pressure regulation and distribution control of pressure flow, an annular feed pressure inlet passage such as groove 16 in the housing bore 3A is provided for pressure feed to the valve sleeve 10, which groove is in communication with an engine driven pump 17 communicating, as symbolized, with a longitudinal housing feed pressure bore 18 leading to groove 16. A pair of exhaust return passages such as grooves 19 and 20, are provided in the housing on respective opposite sides of inlet channel 16, in communication, as indicated, with the reservoir 21.

Annular passages such as grooves 22 and 23 in the housing, outwardly of respective return passages 19 and 20 communicate with the respective pressure chambers 24 and 25 of the servomotor 26. The valve sleeve 10 thus has annular grooves 16 and 21 in which the neutral position shown in FIG. 1 of the valve sleeve effects communication from pump 17 to tank 21 pressurelessly. Cut off occurs when the valve sleeve is axially shifted to selectively connect, depending on direction of steering shift, annular groove 22 or 23 with a return groove, respectively, 19 or 20, to pressurize the respective pressure chamber of servomotor 26. Such neutral pressureless flow, or nearly so, is conventional.

The ends of valve sleeve 10 are provided with respective groups 27 and 28 of passages such as arcuate grooves 29 at one end and arcuate grooves 30 at the other end, longitudinally extended, which grooves are equally angularly arrayed around the periphery. The longitudinal extent of grooves 29 and 30 is predeterminedly limited to form flow control upper and lower edges (as oriented on FIG. 1) coacting with the adjacent housing passages such as grooves 22 and 23. Further, the grooves 29 and 30 are angularly spaced from each other by one-half the angular spacing between the teeth of the rotor gear.

Additionally, the construction provides for the usual continuous longitudinal grooves 31, 32, (FIGS. 2, 3 and 4) and 33 (FIG. 1) interiorly of the valve sleeve 10 for communication of pressure feed from pressure passage bore 18 to the group of grooves 28 comprised of longitudinal grooves 30.

Grooves 29 and 30 are closed against flow in neutral or straight ahead position of valve sleeve 10. In steering positions of the valve sleeve, grooves 29 of group 27 connect, depending on direction of rotation of the steering spindle, with pressure feed bore 18 or with groove 22 leading to pressure chamber 24 of the servomotor 26, while grooves 30 of group 28 communicate with groove 23 or pressure feed channel 18.

Figure 2:
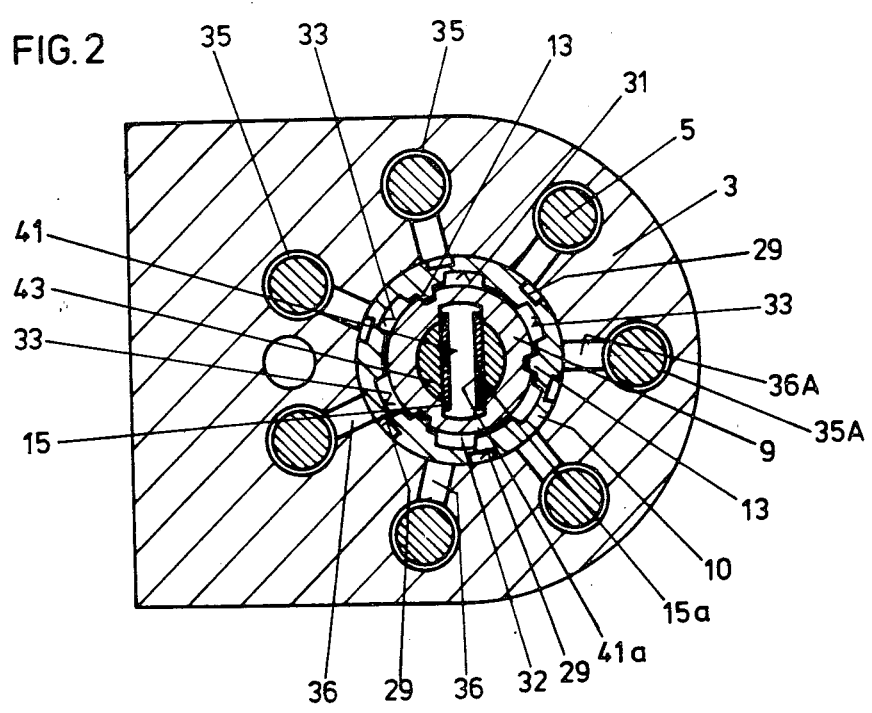
FIG. 2 is a radial section on section line II—II of FIG. 1.
Figure 3:
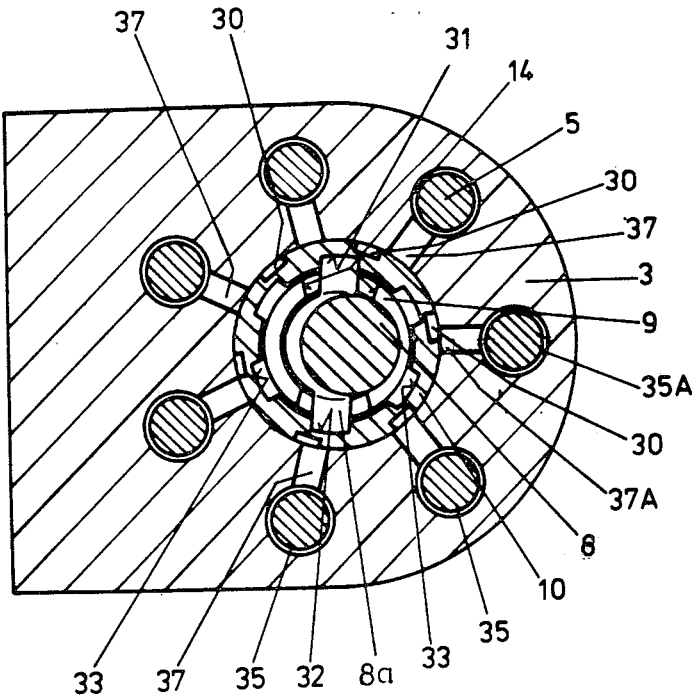
FIG. 3 is another radial section on section line III-—III of FIG. 1.

The pump cells 7 communicate with the grooves 29 and 30 by way of passage such as ports 34 in the cheek plate 2', axial passages 35 which comprise the respective peripheral spacings around the screws 5, and the two groups of passages such as radial bores 36 and 37, which lead from these spacings from around the grooves as seen in FIGS. 2 and 3, upon rotation of steering spindle 9. The arrangement of ports 34 and axial passages 35 is shown in German OS No. 27 18 148 and need not be described in detail. The number of axial passages 35 correspond to the number of spacings between the teeth of the fixed gear 1, i.e., the number of teeth.

Passages such as bores 36 and 37 lead from each axial passage 35. Such bores 36 and 37 always communicate with an axial passage 35, for example, from the axial bore 35A, as shown in FIG. 1, to respective bores 36A and 37A. One set of bores 36A communicates with the group 27 of grooves 29, while the other set of bores 37A communicates with the group 28 of grooves 30.

Upon rotation of the steering spindle 9 (FIG. 4) by a steering wheel (not shown), the steering spindle 9 rotates torsionally against the force of flexible actuating means comprising two leaf springs 15 and 15a and valve sleeve 10 is axially shifted by the thread action at 13, 13a. If manual force is released from the steering spindle the potential energy stored in the stressed springs is sufficient to restore the valve sleeve back to neutral position. These leaf springs at one end extend into grooves of the steering spindle so that rotation thereof will effect torsional stress of the steering spindle for return of the valve sleeve. The springs are arched with reference to the longitudinal axis and centrally contiguous for mutual support. The respective ends 40 and 40a (FIG. 1) of the springs are offset for support against corner surfaces, respectively, 41, 41a of a spring carrier 43 in the steering spindle.

The spring carrier 43 is keyed to the universal joint shaft 8 by way of the pin 8a to hold the other end of the springs initially stationary. As seen in FIG. 2, for neutral position, the contact surfaces 41 and 41a are illustrated aligned with the ends of the leaf springs, but FIG. 4 shows the upper end of the leaf springs now angularly separated from the respective corner surfaces of the holder 43, indicating torsional stress of the steering spindle with compression of the leaf spring curvatures.

Thus, rotation of steering spindle 9 causes the leaf springs 15 and 15a to be stressed initially and valve sleeve 10 axially shifted without as yet rotating the metering pump or spring carrier 43 keyed thereto, but upon release of manual force from the steering spindle, valve sleeve 10 can return to the neutral position. Continued rotation of the steering spindle after the springs are stressed up to a limit of a limit stop 14, in either direction, effects actuation of the metering pump and the steering spindle and valve sleeve then continues to rotate in unison with no futher axial shift of the valve sleeve.

As a result of the arrangement described and the mutual support in axial direction of the leaf springs, it is possible to effect an initial stressing force thereon even in neutral position of the valve sleeve 10. Such initial stressing force can be predetermined so as to be great enough to overcome any possible friction in the coacting components. Accordingly, a positive return to neutral position and a precise equality of pressure in the pressure chambers 24 and 25 is assured.

What is claimed is:

1. In a device of the kind described having a housing with flow passage means controlled by a valve means comprising a valve sleeve, and a steering spindle coaxial with the valve sleeve, including means operative for axially shifting said valve sleeve responsive to spindle rotation bidirectionally for flow control to pressurize and exhaust chambers of a servomotor, and further including a metering pump articulated to said steering spindle; and having actuator means for return to neutral position of said valve sleeve wherein said metering pump initially holds said actuator means against return movement of said valve sleeve permitting rotation of said steering spindle and said valve sleeve responsive to rotation of said steering spindle to effect rotational drive of said metering pump by said steering spindle along with continued rotation of said valve sleeve without further axial shift;

the improvement which comprises:
said actuator means comprising a pair of contiguous arched leaf springs having lengthwise longitudinal curvatures disposed back to back, and comprising means whereby said leaf springs are coupled at one end with said steering spindle and the other end being connected with said metering pump, said valve sleeve being held stationary thereby during initial rotational movement of said steering spindle in axially shifting said valve sleeve for flow control; wherein the curvatures of said leaf springs are compressively flattened against each other by rotation of said steering spindle; said leaf springs being disposed lengthwise longitudinally of the axis of said steering spindle and within said steering spindle.

2. In a device of the kind described as set forth in claim 1, including a spring carrier within said valve sleeve and said leaf springs being supported within said spring carrier; said spring carrier having corner surfaces supporting the ends of said leaf springs; said spring carrier having an end connected to said metering pump at one end of said leaf springs; means connecting the other end of said leaf springs to said steering spindle to be rotated thereby for stressing said leaf springs during relative rotation of said steering spindle relative to said valve sleeve for effecting axial shift of said valve sleeve while storing potential energy in said leaf springs by virtue of said stress to restore said valve sleeve to a neutral position upon release of force stress exerted through said steering spindle.

3. In a device as set forth in claim 1, including slots in said steering spindle whereby said leaf springs are coupled at one end with said steering spindle by extending transversely into said slots.

4. In a device as set forth in claim 2, including slots in said steering spindle whereby said leaf springs are coupled at said one end with said steering spindle by extending transversely into said slots.

5. In a device of the kind described having a housing with flow passage means controlled by a valve means comprising a valve sleeve and a steering spindle coaxial with the valve sleeve, wherein said steering spindle is rotative for rotating and axially shifting said valve sleeve for flow control to pressurize and exhaust chambers of a servomotor, and further including a metering pump articulated to said steering spindle through flexibly compressible stress means;

the improvement wherein said flexibly compressible stress means comprises a pair of arched leaf springs disposed with contiguous mutually supporting arched lengthwise surfaces and means whereby said leaf springs are operatively coupled at corresponding ends with said steering spindle to be compressively stressed by steering spindle rotation when the opposite ends of said leaf springs are held stationary;

the opposite corresponding ends of said leaf springs being operatively connected with said metering pump to be held stationary thereby during initial rotational movement of said steering spindle; wherein said leaf springs extend lengthwise longitudinally of the axis of said steering spindle to be longitudinally compressed on said axis for effecting potential energy for return movement of said valve sleeve.

6. In a device as set forth in claim 5, wherein said leaf springs are disposed longitudinally on the axis of said steering spindle and within said steering spindle.

7. In a device of the kind described as set forth in claim 5, including a spring carrier within said valve sleeve and said leaf springs being supported within said spring carrier; said spring carrier having corner surfaces supporting the ends of said leaf springs; said spring carrier having an end operatively connected to said metering pump at one end of said leaf springs; means connecting the other end of said leaf springs to said steering spindle to be rotated thereby for stressing said leaf springs during relative rotation of said steering spindle relative to said valve sleeve for effecting axial shift of said valve sleeve while storing potential energy in said leaf springs by virtue of said steering spindle torsional stress to restore said valve sleeve to a neutral position upon release of torsional stress exerted through said steering spindle.

8. In a device as set forth in claim 5, including slots in said steering spindle whereby said leaf springs are coupled at one end with said steering spindle by extending transversely into said slots.

9. In a device as set forth in claim 7, including slots in said steering spindle whereby said leaf springs are coupled at said one end with said steering spindle by extending transversely into said slots.

* * * * *